United States Patent [19]
Elliott

[11] 4,385,814
[45] May 31, 1983

[54] SYSTEM FOR CONTROLLING DISTINCT DEVICES IN A THEATER

[75] Inventor: James M. Elliott, Los Angeles, Calif.

[73] Assignee: Paramount Sound Systems Corporation, New York, N.Y.

[21] Appl. No.: 356,825

[22] Filed: Mar. 10, 1982

Related U.S. Application Data

[63] Continuation of Ser. No. 162,801, Jun. 25, 1980, abandoned.

[51] Int. Cl.³ .................................. G03B 21/50
[52] U.S. Cl. ............................ 352/92; 352/11; 352/20; 352/85
[58] Field of Search ................ 352/6, 7, 8, 9, 10, 352/11, 92, 20, 21, 27, 5, 133, 85

[56] References Cited

U.S. PATENT DOCUMENTS

| | | | |
|---|---|---|---|
| 2,714,633 | 8/1955 | Fine | 179/100.1 |
| 3,845,572 | 11/1974 | McCanney | 35/11 |
| 3,932,032 | 1/1976 | Weinstein | 352/11 |
| 3,973,839 | 8/1976 | Stumpf et al. | 352/5 |
| 4,086,005 | 4/1978 | Honebrink et al. | 352/133 |
| 4,256,389 | 3/1981 | Engebretson | 352/11 |

FOREIGN PATENT DOCUMENTS

| | | |
|---|---|---|
| 1003759 | 5/1976 | Canada .................................. 352/78 |
| 309208 | 12/1927 | United Kingdom . |
| 342284 | 7/1929 | United Kingdom . |
| 433285 | 11/1933 | United Kingdom . |

OTHER PUBLICATIONS

"Fantasound" and Vitasound in the Journal of the Society of Motion Picture Engineers, Aug., 1941.

Primary Examiner—Russell E. Adams
Attorney, Agent, or Firm—Body, Vickers & Daniels

[57] ABSTRACT

A system for controlling a plurality of distinct devices in a theater displaying a projected motion picture or other visual program and having a multichannel sound signal contained on a moving film or other type strip, which system has a memory unit for storing groups of digital control signals for operating the distinct devices, each forming a channel, in a selected manner during a selected portion of the moving strip. This system has means for selecting one of the groups of the digital control signals for a selected portion of the visual program and means independent of the strip for causing the stored digital control signals of the selected group to be outputted in a time sequence corresponding to the selected portion of the visual program. There is provided an improvement wherein the selecting means includes a digital code recorded on the moving strip and the code comprises a constant, repeating synchronization digital code and a unique digital time code corresponding to the selected group of digital control signals to be outputted in a given time sequence by using hardwired counters for processing the selected digital signals.

12 Claims, 22 Drawing Figures

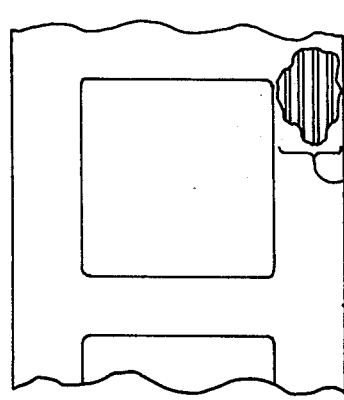
FIG. 3
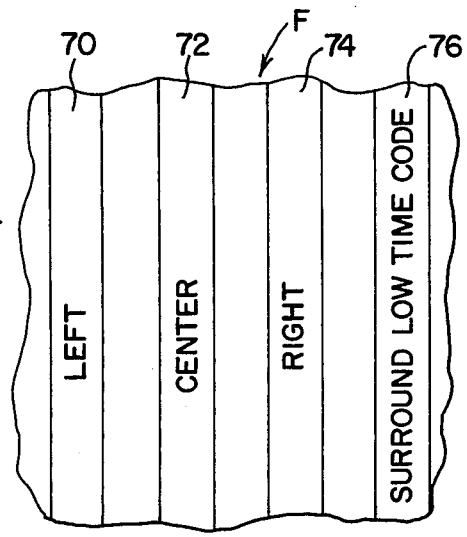
FIG. 3A
FIG. 4
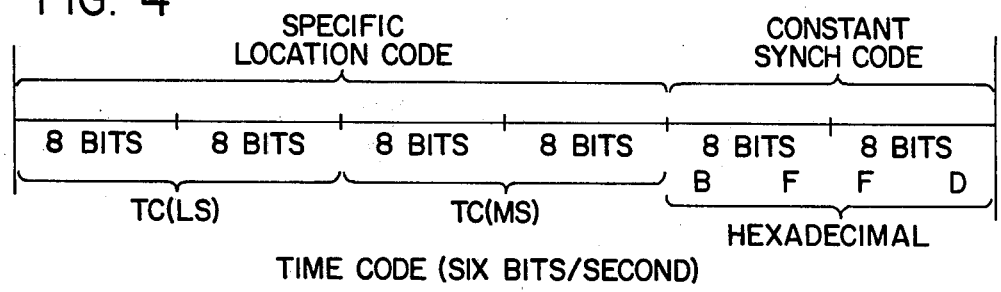
TIME CODE (SIX BITS/SECOND)
FIG. 5
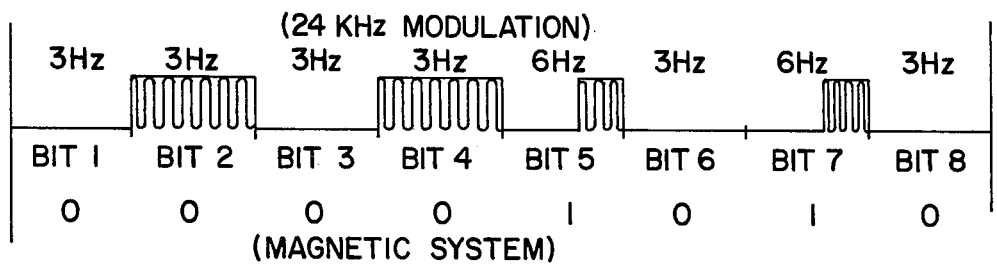
(MAGNETIC SYSTEM)

CUE ARRAY DIRECTORY

| (1) TC (LS) |
| (1) TC (MS) |
| (1) START LOCATION (LS) |
| (1) START LOCATION (MS) |
| (2) TC (LS) |
| (2) TC (MS) |
| (2) SL (LS) |
| (2) SL (MS) |
| (3) TC (LS) |
| (3) TC (MS) | etc

IF NO CUES, NO TC LOCATE

FIG. 7

CUE SELECT PROGRAM SEQUENCE (AFTER LOCATION CODE)

(A) SCAN DIRECTORY FOR CUES (i.e. ANY TC LOCATION?)

(B) IF YES, DETERMINE START LOCATION IN STACK ($TC_X$)

(C) LOCATE NEXT START LOCATION (i.e. FOR $TC_X + 1$)

(D) SUBTRACT 1 FROM $TC_X + 1$ START LOCATION (E) DIVIDE BY THREE (3) (BECAUSE 3 BYTES PER CUE) TO OBTAIN NUMBER OF CUES (F) SCAN BETWEEN START AND END FOR NUMBER OF CUES PER CHANNEL.

(G) LOAD COUNTER MEMORY FOR EACH CHANNEL WITH NUMBER OF CUES AND FLAG LOCATIONS (MEMORY POINTERS F1-F15)

(H) OUTPUT CUES TO MEMORY STORAGE BY CHANNEL DROPPING EACH CHANNEL AS COUNTER DECREMENTED TO ZERO.

3 BYTE CUE

IF RATED=0 STEP RATE BINARY ⟶ 2 PLACES

SYNCH  CUES FOR CHANNEL

DESTINATION READ (LOAD IN RAM)
CHECK TO DETERMINE IF THERE
DETERMINE TIME TO REACH DESTINATION (RATE)
DETERMINE INCREMENTS OR DECREMENT
LOAD INCREMENTS OR DECREMENTS INTO $CTC_X$
AT INTERRUPT, COMPARE TO DESTINATION
REPEAT UNTIL COMPARISON MADE

FIG. 10B

ATTENUATION TABLE

| | | | | | | | |
|---|---|---|---|---|---|---|---|
| 00H | −0.0dB | 00 | FFH | 28H | −20.0dB | 36 | D7H |
| 01H | −0.5dB | 01 | FEH | 2AH | −21.0dB | 37 | D5H |
| 02H | −1.0dB | 02 | FDH | 2CH | −22.0dB | 38 | D3H |
| 03H | −1.5dB | 03 | FCH | 2EH | −23.0dB | 39 | D1H |
| 04H | −2.0dB | 04 | FBH | 30H | −24.0dB | 40 | CFH |
| 05H | −2.5dB | 05 | FAH | 32H | −25.0dB | 41 | CDH |
| 06H | −3.0dB | 06 | F9H | 34H | −26.0dB | 42 | CBH |
| 07H | −3.5dB | 07 | F8H | 36H | −27.0dB | 43 | C9H |
| 08H | −4.0dB | 08 | F7H | 38H | −28.0dB | 44 | C7H |
| 09H | −4.5dB | 09 | F6H | 3AH | −29.0dB | 45 | C5H |
| 0AH | −5.0dB | 10 | F5H | 3CH | −30.0dB | 46 | C3H |
| 0BH | −5.5dB | 11 | F4H | 3EH | −31.0dB | 47 | C1H |
| 0CH | −6.0dB | 12 | F3H | 40H | −32.0dB | 48 | BFH |
| 0DH | −6.5dB | 13 | F2H | 44H | −34.0dB | 49 | BBH |
| 0EH | −7.0dB | 14 | F1H | 48H | −36.0dB | 50 | B7H |
| 0FH | −7.5dB | 15 | F0H | 4CH | −38.0dB | 51 | B3H |
| 10H | −8.0dB | 16 | EFH | 50H | −40.0dB | 52 | AFH |
| 11H | −8.5dB | 17 | EEH | 54H | −42.0dB | 53 | ABH |
| 12H | −9.0dB | 18 | EDH | 58H | −44.0dB | 54 | A7H |
| 13H | −9.5dB | 19 | ECH | 5CH | −46.0dB | 55 | A3H |
| 14H | −10.0dB | 20 | EBH | 60H | −48.0dB | 56 | 9FH |
| 15H | −10.5dB | 21 | EAH | 68H | −52.0dB | 57 | 97H |
| 16H | −11.0dB | 22 | E9H | 70H | −56.0dB | 58 | 8FH |
| 17H | −11.5dB | 23 | E8H | 78H | −60.0dB | 59 | 87H |
| 18H | −12.0dB | 24 | E7H | 80H | −64.0dB | 60 | 7FH |
| 19H | −12.5dB | 25 | E6H | 88H | −68.0dB | 61 | 77H |
| 1AH | −13.0dB | 26 | E5H | 90H | −72.0dB | 62 | 6FH |
| 1BH | −13.5dB | 27 | E4H | C8H | −99.5dB | 63 | 37H |
| 1CH | −14.0dB | 28 | E3H | | | | |
| 1DH | −14.5dB | 29 | E2H | | | | |
| 1EH | −15.0dB | 30 | E1H | | | | |
| 1FH | −15.5dB | 31 | E0H | | | | |
| 20H | −16.0dB | 32 | DFH | | | | |
| 22H | −17.0dB | 33 | DDH | | | | |
| 24H | −18.0dB | 34 | DBH | | | | |
| 26H | −19.0dB | 35 | D9H | | | | |

SYSTEM FOR CONTROLLING DISTINCT DEVICES IN A THEATER

This is a continuation, of application Ser. No. 162,801 filed June 25, 1980 now abandoned.

This invention relates to the art of motion pictures and other visual arts and more particularly to a system for controlling distinct devices in a theater or other area and a film strip for use in this system.

RELATED APPLICATIONS

This invention is related to a system of prior application Ser. No. 108,180 filed Dec. 31, 1979, which is commonly owned and is a continuation of application Ser. No. 946,117 filed Sept. 27, 1978, now abandoned. These prior applications are incorporated by reference herein for general background purposes only.

PRIOR ART

Controlling sound systems by information on a film strip is taught by Fine U.S. Pat. No. 2,714,633; Weinstein U.S. Pat. No. 3,932,032; and Stumpf U.S. Pat. No. 3,973,839. Controlling of switching function in a projector system is disclosed in Honebrink U.S. Pat. No. 4,086,005.

BACKGROUND OF INVENTION

The present invention is particularly useful for motion picture theaters and it will be described with reference thereto; however, the invention has boarder applications and may be used in other combined visual and sound programs.

During recent years there has been substantial development work relating to improving the sound and special effects in a theater displaying a motion picture. These efforts have progressed from individually controlling the amplified volume of various speakers in synchronization with a moving film strip to controlling various special effects in a real-time sequence. Thus, an audience viewing the film strip will have a physical realization commensurate with the film being projected. Most of these systems have been somewhat rudimentary and have not obtained the desired physical sensation in both sound and special effects. In the prior copending application, there is described a system wherein a series of digital control signals are stored in a separate memory unit and a time code is recorded on a moving film strip to indicate the section of the film strip being projected. As this code is recognized, the memory unit outputs a series of selected signals which control the various channels connected to devices in the theater. This has been a substantial advance in the total packaging of the film wherein separate memory modules can be provided with a given motion picture to control the various sound devices throughout the theater to obtain a real-time sensation corresponding with the film strip being projected. The present invention relates to an improvement in this type of control system.

THE INVENTION

The present invention relates to an improvement in the system wherein cues or digital control signals are stored in a separate memory unit and outputted from the memory unit to control distinct devices in a theater, which improvements relate to the type of time codes or signals on the film strip and the type and processing of the cues issuing from the memory unit. These signals control the actual distinct devices in separate channels. A variety of programmable devices could be utilized in the present invention to recognize the time codes on the film strip and process the various digital cues or control signals from the memory unit for updating the real-time conditions of the various devices within a theater, be they speakers or special effects devices, such as lights, curtains, sirens, or other special effects devices.

In accordance with the invention, there is provided an improvement in a system for controlling a plurality of distinct devices in a theater displaying a projected motion picture contained on a moving film strip and in synchronization with the film strip. This type of system includes a memory unit for storing groups of digital control signals for operating the distinct devices in a selected manner during a selected portion of the moving strip, means for selecting one of the groups of digital control signals for a selected portion of the moving strip and means independent of the film strip for causing the stored digital control signals of the selected group to be outputted in a time sequence corresponding to the selected portion of the film strip being projected. The improvement of the present invention relates to the provision of the selecting means as including a digital time code recorded on the moving strip which code includes a constant, repeating synchronization digital code portion and a unique digital time code portion corresponding to the selected group of digital control signals to be outputted in a given time sequence of the film strip. By providing this type of time code on the moving strip, the unique digital time code can have a relatively, subaudio low modulated frequency using a high frequency carrier exceeding the audio range of 18–20 K Hertz. In practice, the carrier is 24 K Hertz and the modulation is either 6 Hertz or 3 Hertz when using a magnetic pick-up system.

In accordance with another aspect of the invention, the time code is formed into two separate digital words so that several segments can be specifically coded without requiring a processing unit having a relatively high input capacity.

In accordance with another aspect of the present invention, the control signals are stored in a first memory unit and a second directory memory unit is provided for storing the identifiable time codes with the address of the corresponding memory control signal groups. In this manner, the directory memory unit can identify the area of the first memory unit in which the cues or digital control signals are stored. This allows easy access to the stored cues or digital control signals without scanning of the total independent and separate cue containing memory unit. By using this concept, only the directory storage unit needs to be scanned for comparison with the incoming time code to select the desired group of control signals which are to be used in a given segment of the motion picture strip. This substantially reduces the processing time and resolution of the control system.

In accordance with another aspect of the present invention, the processing of the cues or digital control signals for each of the distinct devices or channels is done by a hardwired digital counter wherein a portion of the cue is loaded into the counter. This counter is counted at a speed commensurate with the film strip speed so that the several devices are controlled by separate counters in real-time synchronization. Each channel has a designated counter.

In accordance with another aspect of the present invention, each of the digital control signals includes first, second, and third digital portions or words, with the first word corresponding to the desired magnitude of the specific control device, the second word corresponding to the real-time rate at which the device is changed to the selected magnitude and the third word corresponding to the delay before commencing the transition of a selected device or channel toward the magnitude destination. In this manner, the total profile of a given change for a selected time interval can be provided in a read only memory unit or PROM. By incorporating this concept with the hardwired counters for each controlled device or channel, a substantial reduction in the memory capacity of the total system can be realized while accurate real-time changes in the various controlled devices in a theater can be effected. The order of the words may vary.

In accordance with another aspect of the present invention there is provided an improvement in a motion picture film of the type including a digital code indicative of the location of the film for the purpose of calling up a preselected stack of separately stored cues or control signals for devices or sound channels in the theater. In accordance with this improvement, the signal on the film includes a standard synchronizing signal followed by a digital signal indicative of a segment of the film strip.

The primary object of the present invention is the provision of an improved system for controlling a plurality of distinct devices in a theater, which system employs coding, cue profiles and processing steps that substantially reduce the memory capacity of a system for calling up the cues in accordance with a digital signal recorded on the film.

Another object of the present invention is the provision of a system, as defined above, which system is compatible with existing projection systems and sound equipment and can be employed in various theaters.

These and other objects and advantages will become apparent from the following description taken together with the accompanying drawings defined in the next section.

BRIEF DESCRIPTION OF DRAWINGS

FIG. 3 is an enlarged view of a motion picture film strip utilized in practicing the present invention;

FIG. 3A is an enlarged view of the portion of the film indicated in FIG. 3 showing the various sound tracks;

FIG. 4 is a graph illustrating the synchronization code and time code employed in the present invention;

FIG. 5 is a graph showing the modulation scheme employed in the magnetic embodiment of the present invention;

FIG. 7 is a cue select program sequence illustrating the processing steps employed in the preferred embodiment of the present invention;

FIG. 10B is a chart for attenuation of speakers as contemplated in the preferred embodiment of the present invention;

PREFERRED EMBODIMENT OF THE INVENTION

Figure 1:
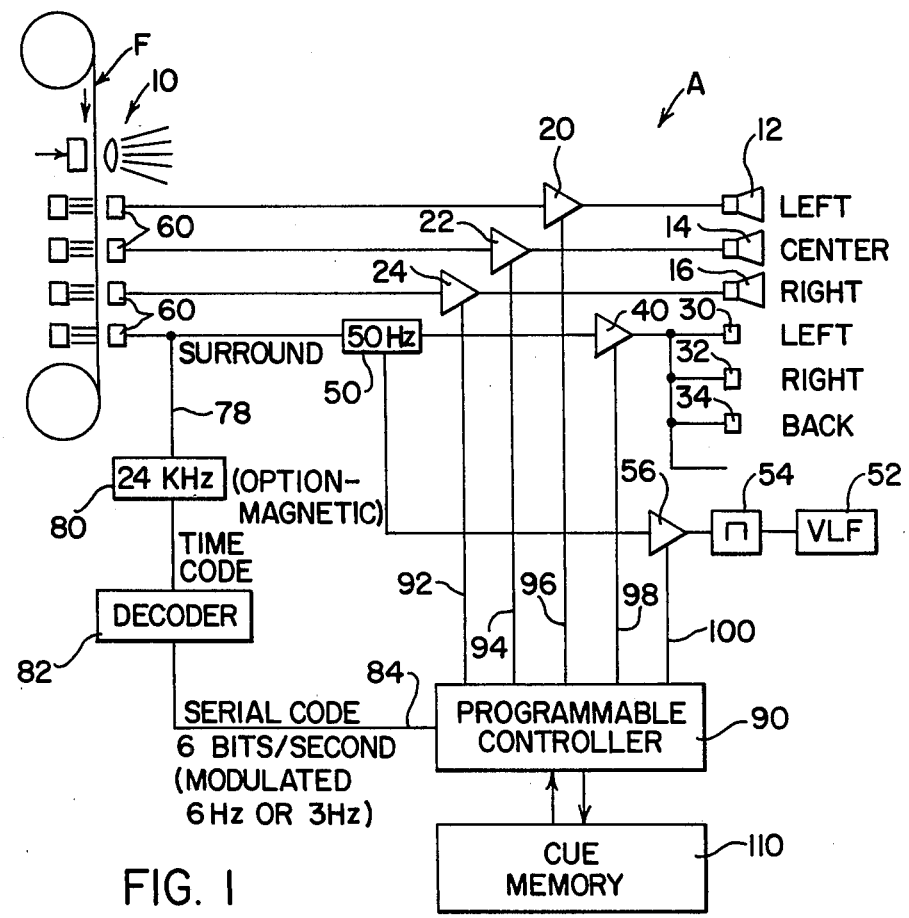
FIG. 1 is a wiring diagram of a system employing the present invention.

Referring now to the drawings wherein the showings are for the purpose of illustrating preferred embodiments of the invention only and not for the purpose of limiting same, FIG. 1 illustrates, schematically, a system A for projecting a motion picture contained on film strip F in accordance with standard projecting practices. A projector 10, having standard characteristics, displays the motion picture contained on strip F. Standard speakers 12, 14 and 16 are located at various positions within a projecting theater. Each of these speakers is controlled by one of the voltage control amplifiers 20, 22, 24 so that the volumes of the speakers are changed in accordance with the dynamic requirements of the picture being displayed. As is often provided, speakers 30, 32, 34 provide a surrounding sound envelope which respond to frequencies above 50 Hertz as controlled by a dual pass filter 50. A very low frequency horn 52 is also provided in the theater to reproduce low frequencies below 50 Hertz which is provided from a low band output of dual pass filter 50 through a low frequency filter 54 and controlled by a voltage controlled amplifier 56. Optical pick-ups 60 read four separate optical channels or sound tracks on strip F, which tracks are shown as tracks 70, 72, 74 and 76 in FIG. 3A. As can be seen, optical sound track 70 contains a sound program signal for left speaker 12. Track 72 provides a program signal for center speaker 14. In a like manner, track 74 provides a program signal for the right speaker 16. Optical sound track 76 contains the surround signal which also includes low frequency program signal information to control low frequency horn 52, as shown in FIG. 1. Of course, in practice the low frequency from all tracks 70, 72, 74 and 76 can be directed to filter 50 for separation by this filter and filter 54 into a low frequency signal to drive horn 52. As so far described, system A is not substantially different from standard systems available for controlling various speakers in a theater displaying a film strip, such as film strip F. In accordance with the preferred embodiment of the invention, there is a low frequency time code contained in optical track 76. This code will be explained in detail later; however, it is appreciated that the code is used for selecting certain control information which is used during a preselected time sequence to control the voltage applied to the voltage controlled amplifiers shown in FIG. 1. To accomplish this, the signal from track 76 is directed in line 78. This signal is a low frequency of 6 Hertz or 3 Hertz when using a 35 MM optical system. When a magnetic pick-up is used, such as on a 70 MM film, a 24 Kilohertz filter 80 is provided, which allows passage of only the time code. The time code in a magnetic system is a 24 Kilohertz signal modulated into a low frequency signal, as will be explained later. The low frequency time code is decoded in an appropriate decoder 82, shown in detail in FIG. 12, and is provided as a serial, digital code having six bits per second and appearing in line 84. This line forms the control input for a programmable controller 90 having a plurality of analog control lines 92, 100 for controlling the voltage applied to amplifiers 20, 22, 24, 40 and 56 or to any other amplifier to be controlled. Of course, programmable controller 90 could also have digital output lines for controlling switching functions such as curtains, lights, sirens, motors, etc. A separate memory unit 110 stores groups of digital cue information or control signals which are processed by the programmable controller 90 to obtain the desired outputs in analog lines 92-100 and in any binary or digital output lines. Memory unit 110 shown in FIG. 1 is a PROM that is assigned to a given film strip F being projected. Consequently, memory unit 110 containing the separate and distinct identifiable groups of cues to be processed during certain segments of film strip F is unique for a given film strip and is provided with the film strip for any theater having equipment to use the present invention. Of course, sound tracks 70, 72, 74 and 76 could be magnetic instead of optical. Less than four tracks could be employed as long as a time code is recorded periodically along the length of the film to identify certain specific segments of the film as the film is being projected.

Figure 2:
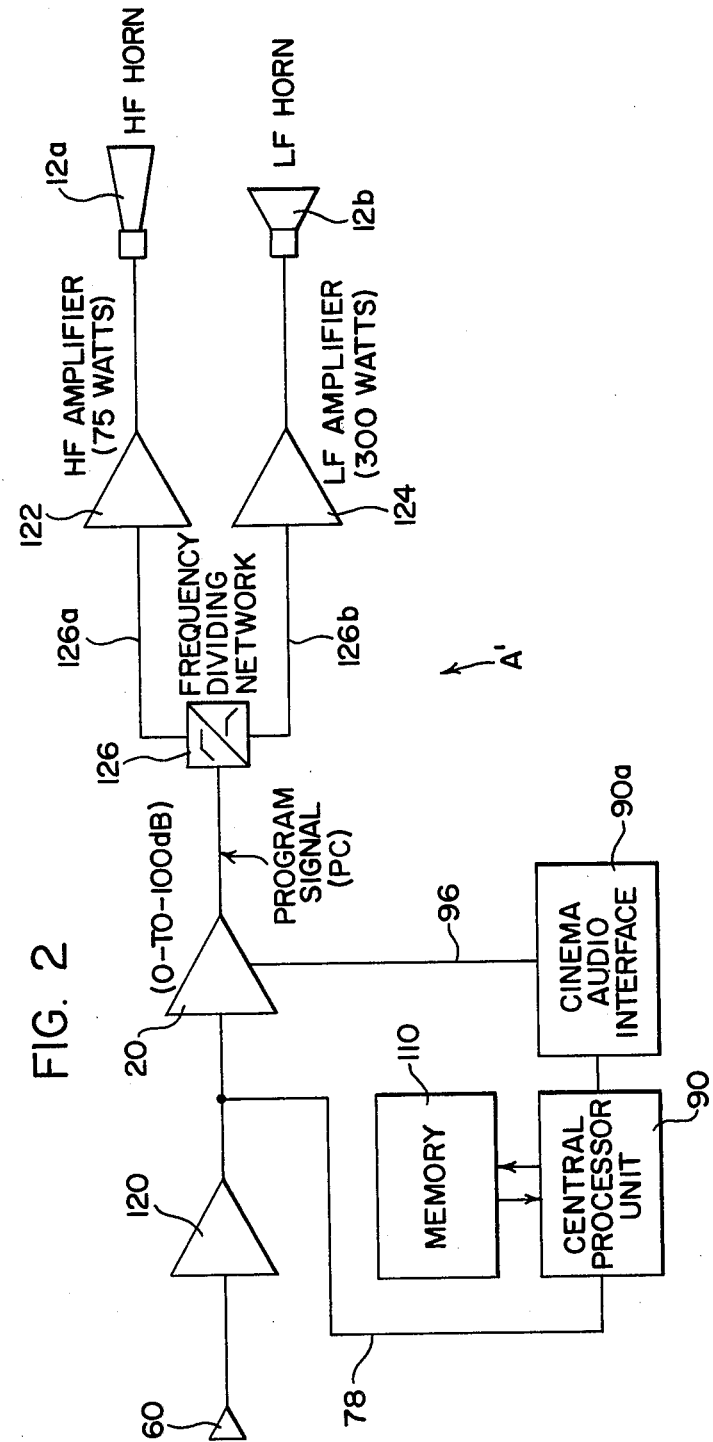
FIG. 2 is a diagram illustrating a single channel of the system shown in FIG. 1 and employing the preferred embodiment of the present invention.

Referring now to FIG. 2, a single channel A' of system A shown in FIG. 1 is illustrated in more detail and incorporating the various components of the preferred embodiment of the invention. In this more detailed layout, the left speaker system is divided into a high frequency horn 12a and a low frequency horn 12b. The programmable controller is illustrated as a central processing unit 90 and an audio interface 90a which directs the analog outputs of the central processing unit to the proper voltage control lines, such as lines 96 used to control amplifier 20. The output of this amplifier passes a dual band filter 126 so the output of the filter in lines 126a, 126b is directed to power amplifiers 122, 124, respectively, of horns 12a, 12b, respectively. This schematic layout shows a single channel controlled by the program signal on track 70. Each of the channels shown in FIG. 1 can be modified to provide a dual frequency response speaker system to make the speakers more compatible with the frequency being amplified and projected in the theater.

TIME CODE

Referring now to FIGS. 4 and 5, the time code employed in the present invention is a six word digital code extending over eight seconds of the film moving at normal speed for a 35 MM film. Each word includes eight digital bits with the first two words being a constant synchronous code, as shown in FIG. 4. In the preferred embodiment, these words are hexadecimal DF and hexadecimal FB. Thus, in each time code there are two words which remain constant and includes 14 logic one signals. The last four eight bit words are unique for each segment of the film and include a most significant number TC (MS) and a least significant number TC (LS). These last four words each includes four bits of location address, followed by three logic zero signals and a parity bit. Since each of these words includes at least three logic zero signals, they can be distinguished easily from a synch code word. The four distinct bits of the two TC(MS) words combine for a most significant address in an eight bit mode. The same is true of the TC(LS) words. These two eight bit combined words indicate the specific location in memory unit 110 of the cues to be outputted for controlling the operation of various distinct devices as a specific eight second portion of the film strip is being projected. Consequently, each eight second section of the film is identified by a constant synchronization code including sixteen bits and a unique location code including thirty-two bits. The code appears at a rate of six bits per second. When a 35 MM optical system is employed, the signal is recorded as a 3 Hertz signal for a logic zero and a 3 Hertz signal for a logic one. When using the invention in a 70 MM format a magnetic sound track is used and the time code signal takes the form of the wave shape illustrated in FIG. 5. A 24 Kilohertz carrier is recorded on track 76 in a form modulated at either 3 Hertz or 6 Hertz. If the modulation is 3 Hertz, there is no change of state during a film segment assigned to a bit of information. If the 24 Kilohertz signal is modulated at 6 Hertz, then there is a change of state during a film segment assigned to a bit of information. Consequently, in either the optical system or the magnetic system any change of state during a film segment assigned to a bit of information indicates a different condition than no change of state. In practice, a change of state is identified as a logic 1. As shown in FIG. 5, bits 1, 2, 3, 4 are all at a logic 0. Bit 1 is parity and bits 2, 3, and 4 remain at logic zero. Thus, through bits 1-4 the signal is 3 Hertz and are each logic 0. At bit 5, the modulation of the 24 Kilohertz signal is increased to 6 Hertz. Thus, there is a change of state during bit 5 which indicates a logic 1. In a like manner, bit 6 is a logic 0 and bit 7 is a logic 1. Any appropriate decoder can be provided for distinguishing between a 3 Hertz signal and a 6 Hertz signal. (See FIG. 12) Thus, the serial data along film strip B in track 76 can be identified as a digital number. Of course, other arrangements could be provided for providing the time code; however, in accordance with one aspect of the invention when using a magnetic system the high frequency signal above the audio range is modulated at a low frequency rate below the audio range. Consequently, a high band width can be obtained for easier and more efficient identification and processing without sound distortions. By utilizing the time code concept illustrated in FIGS. 4 and 5, the film strip can have imprinted thereon specific identification indicating the time segment or segment of the film being projected at any given real-time period.

STORAGE AND LOCATION OF CUES

Figures 6, 6A:
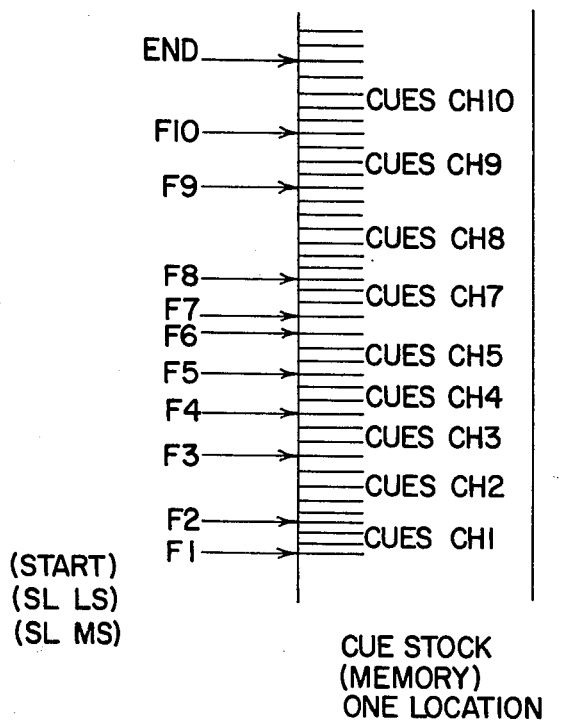
FIG. 6 is a chart showing the cue stack of a memory unit for a single time segment to be processed.
FIG. 6A is a chart illustrating the cue array directory employed in the preferred embodiment of the present invention.

When the second and third word of the time code, TC(MS) and TC(LS), as shown in FIG. 4, are decoded and recognized, they identify a specific location in memory units 110 where the cues are stored for controlling the various outlet channels of the system A shown in FIG. 1 during a preselected time sequence of film F. These cues are digital words stored in a group within the memory unit and are processed, as will be explained later to control each of the channels in accordance with the information contained in each of several cues. The digital words or cues to be output in a given time segment identified by the specific location time code control each channel during an eight second interval in the preferred embodiment. Each of the channels can employ several cues in sequence during a time period being processed. By selecting the cues and outputting them in sequence, each of the channels of system A is separately controlled independent of the film strip itself. In this manner, very little intelligence needs to be physically imprinted on the film strip to provide complex sound reproduction and control in a theater. As will appear later with respect to FIGS. 8 and 9, each cue is three separate and distinct digital words which are stored in stacked sequence within memory unit 110. When a selected group of cues or digital control signals are requested for a given portion of the film strip by the code on the film strip, the stacked cues in a specific memory location are destacked and placed in an appropriate RAM memory unit for individual processing during a time sequence. The stacking and destacking arrangement employed in the present invention is illustrated in FIGS. 6, 6A, 7 and 13. The preferred embodiment of the invention includes 14 analog channels and one digital channel having eight bits. The three word cues are stacked in memory as schematically illustrated in FIG. 6. Flags F1–F10 are the starting addresses for the stacked cues for each of several channels to be processed as a group during a preselected time sequence. Between these flags are stored the three word cues of each of the channels. As can be seen, the flags have a different memory spacing according to the number of cues between the flags and for each channel. In the illustrated embodiment, channel No. 2 contains substantially more cues than channel No. 6, which has no cues. However, a flag is used to indicate the specific location where each of the cues for a specific channel are located in the read only memory unit or PROM 110. As can be seen, the cues between flag F1 and the end of a group of cues are serially stored in a preselected area of read only memory 110. To locate the cues in the memory unit, a cue array directory is provided in accordance with the scheme shown in FIG. 6A. This cue array directory includes the two word time code corresponding to the digital representation of the time codes shown in FIG. 4 and recorded serially on film F. This code is followed by a start location having a least significant word LS and a most significant word MS. This two word start location indicates the location of the first flag F1 for the cues stacked in a particular location of memory unit 110. Thus, when a preselected time code is identified by comparison with the stored words TC(LS), TC(MS), the next two digital locations in the cue array directory, shown in FIG. 6A, are the starting words or locations for the group of cues to be processed. Only the starting location is identified in the directory array. During any time interval being processed, only a preselected number of cues from memory 110 are to be processed. For that reason, it is necessary to determine the end of the cue stack of a given time group. This can be obtained by locating the start words for the next, numerically adjacent time code which words will be one step beyond the end of the cues to be processed during a given cycle. Consequently, by finding the start location of a cue stack and the start location of the next cue stack, the memory area defined between these locations contains the cues of a given group. Thus, the cue array directory is used to identify the particular cues to be processed during a given interval identified by a time code recorded on track 76.

Figure 11:
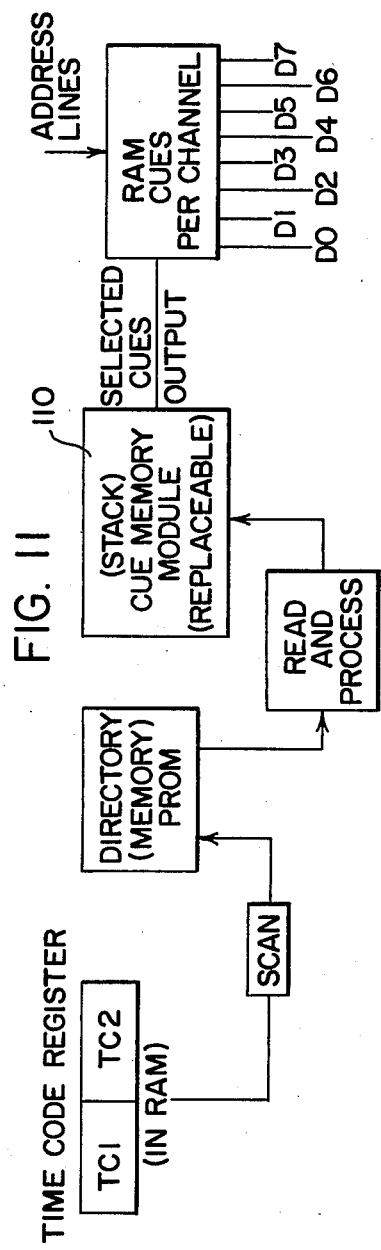
FIG. 11 is a block diagram illustrating operating characteristics of the processing employed in the preferred embodiment of the present invention.
Figure 13:
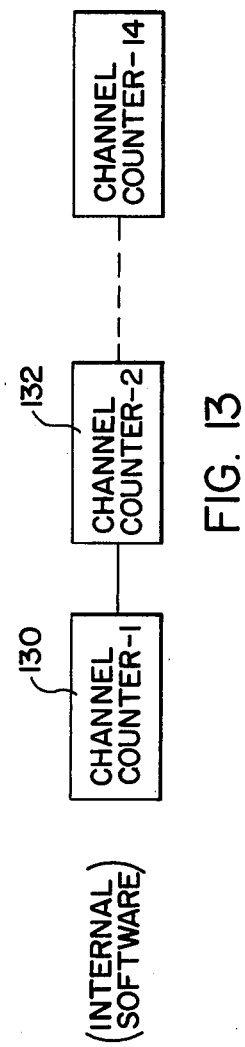
FIG. 13 is a block diagram illustrating the counter arrangement employed in processing information as set forth in FIGS. 6, 6A and 7.

The process for locating and destacking the cues to be used during a given eight second time interval is set forth in the cue select program sequence shown in FIG. 7. After a time code has been identified and set in a time code register of a RAM memory unit incorporated with processor 90, the cue array directory is scanned to locate the start location in the stack of cues or control signals to be processed. The next step is to locate the starting location for the next group of cues. Thereafter, by subtracting one from the subsequent starting location, the end location for the cues to be processed is identified. Since each cue includes three separate words stacked in memory unit 110, the number of words between the start and end locations of a cue stack to be processed is divided by three. This provides the number of cues to be processed. Thereafter, the memory locations between the start and end of a stack are scanned for the number of cues located in each channel. This number is loaded into software counters, schematically illustrated as counters 130, 132, etc. in FIG. 13. A software counter or subroutine is provided for each of the channels to be processed and each counter is loaded in sequence from the highest priority channel No. 1 to the lowest priority channel No. 15, with the number corresponding to the cues in each of the channels. Thereafter, the individual three word cues are destacked and located in a scratch pad or RAM memory unit with the cues of each channel being separately stacked for subsequent processing on a channel basis. As the cues for the first channel are stacked in the RAM, the software counter shown in FIG. 13 counts to zero. Thereafter, the next group of cues is stored in a separate identifiable location in the associated RAM. Thus, after the last software counter has counted to zero, all of the cues have been destacked from PROM 110 and located in identifiable positions within an associated RAM. As can be seen, by the use of a cue array directory in connection with a stacking of the separate and distinct cues for a given group at identifiable locations in the read only memory, the cues for each channel can be outputted and stacked in identifiable locations for subsequent processing during the time interval identified by the time code as it appears on and is read from film F being projected by system A. The processing scheme shown in FIGS. 6, 6A and 7 is shown in block diagram form in FIG. 11 wherein the decoded time code is stored in RAM and is used to scan the memory directory of unit 110. This scanning process operates on the replaceable cue memory 110 to output selected cues into certain areas of the scratch pad RAM. The cues are stored in the RAM by channel to be processed during a selected time interval.

As previously mentioned, the two word location portion of the time code is processed after a standard synchronizing word has been recognized. A variety of circuits could be employed for this purpose; however, the preferred embodiment of the invention for inputting the time code into the programmable controller in parallel fashion on data lines D0–D7 is illustrated schematically in FIG. 12. In this circuit, standard decoding chips 140, 142 accept modulated time code words TC1, TC2, respectively. Code TC1 is a train of signals from one projector and TC2 is a similar train from another projector. Except during a short changeover, only one of the trains is being developed. The processing of the 3 Hertz or 6 Hertz signals in TC1 will be discussed in detail and this description will apply to code TC2. Chips 140, 142 are biased to correspond with the six bit per second format of the incoming code by appropriate external tank circuits only one of which is shown on each of the chips. The standard chips (74LS221) are dual circuit chips which recognize positive and negative going edges during a time segment. Serial output signals of these edges appear on terminals 4, 12 and are directed to NAND gates 150, 152. The output of these gates provides a digitized code signal in lines 154, 156 for each of the incoming codes and includes either a logic 0 or a logic 1 at each bit. These signals are also directed to each of the stages of a chip 160 to sense a change in state during a bit time. This chip is tuned to 6 Hertz by external biasing circuits, only one of which is shown. The outputs of chip 160 are the clocking pulses appearing on terminals 12, 4. These clocking pulses appear in lines 170, 172 and are used at the inputs of chip 190 which removes the clock from the code pulses TC1, TC2. The serial data of the time code words appearing in lines 192, 194 is directed to the input of USART chips 200, 202, respectively. These same chips receive clocking pulses in lines 170, 172. Thus, when a synchronization word has been received and directed to the No. 11 terminal of USART 200, 202, the chips shift from a HUNT mode to a READ mode. The serial information on lines 192, 194 is then applied in parallel on data lines D0–D7 for subsequent use in programmable controller 90. Since the two binary code words are not received at the same time, each of the USART chips 200 and 202 operates in sequence to provide data to the programmable controller identifying the two time code words in parallel form, but in sequence. The sequence is started by the synchronization pulse in line 200a or line 202a. Thus, after the existence of a standard identification word has been noted, each of the two location words is directed in sequence and in parallel fashion, onto the data lines D0–D7 by either chip 200 or chip 202 for storage into the time code register schematically illustrated in FIG. 11. Consequently, the time code is identified and inputted into digital programmable controller 90 for processing of the cues as described with respect to FIGS. 6, 6A, 7 and 13.

CONTROLLING DEVICES BY CUES

Figure 8:
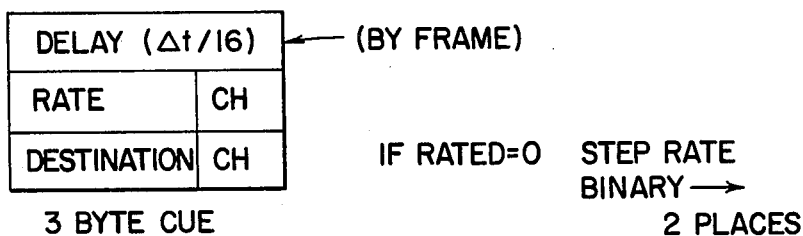
FIG. 8 is a layout showing the cue or digital control signal stored in a memory unit as used in the preferred embodiment of the present invention.
Figure 9:
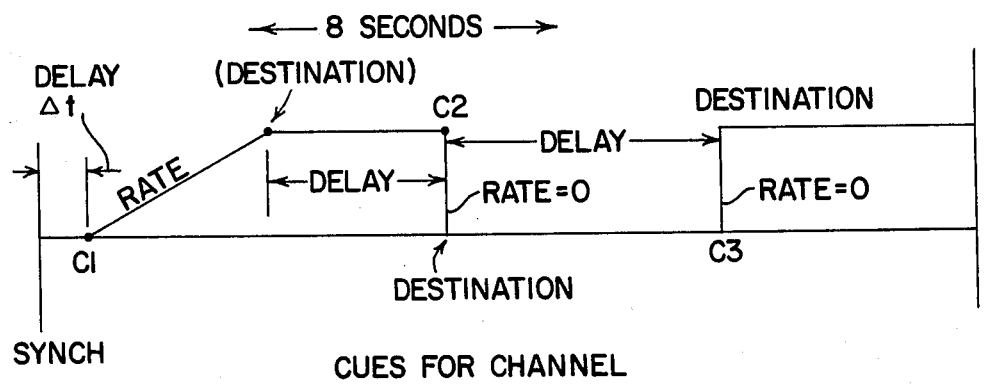
FIG. 9 is a time chart showing the processing of a single channel in accordance with several cues occurring during a preselected time interval for a given channel of the system shown in FIGS. 1 and 2.

Each of the three word cues has the format illustrated in FIG. 8 with the first eight bit word representing a delay. The second word includes six bits of information regarding the rate of change during the cue while the last two bits indicate the channel of the cue. The third word includes six bits representing the final destination of the cue and two identification bits for a channel. Thus, the second and third word includes four bits for selecting the channels for which the cue is to be used. The delay indicates a delay for processing the cue, which delay can either be a delay from the synchronization signal or a delay from the prior cue being processed on a selected channel. The operation for the cue for a given channel is illustrated in FIG. 9 wherein cue C1 has a delay from synchronization and a final destination with a selected rate indicating the manner in which the progression commences. If this channel controls a voltage controlled amplifier of a speaker, the rate is the speed at which the speaker is raised from an existing volume to a destination volume. If the rate were zero, the destination would be reached at once. This is schematically illustrated with respect to the cue C2. There is a zero rate of change. Cue C2 has a delay from the previous cue C1. In a like manner, the third cue C3 for a selected channel in an eight second period being processed has a fixed destination and a change rate of zero. The volume or magnitude of the channel control line from processor 90 is shifted directly to the new destination of cue C3. This process continues over the eight second period being controlled by the various cues being outputted in series on lines 92–100 as shown in FIG. 1.

Figures 10, 10A:
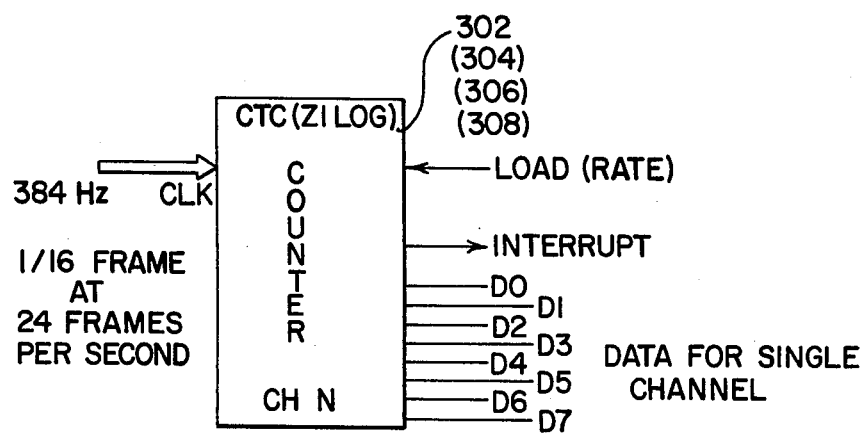
FIG. 10 is a hardwired counter of the type employed for processing the cue format shown in FIG. 8 to provide the time graph or chart arrangement illustrated for a single channel in FIG. 9.
FIG. 10A is a list of processing steps employed in utilizing the counter section shown in FIG. 10.
Figure 14:
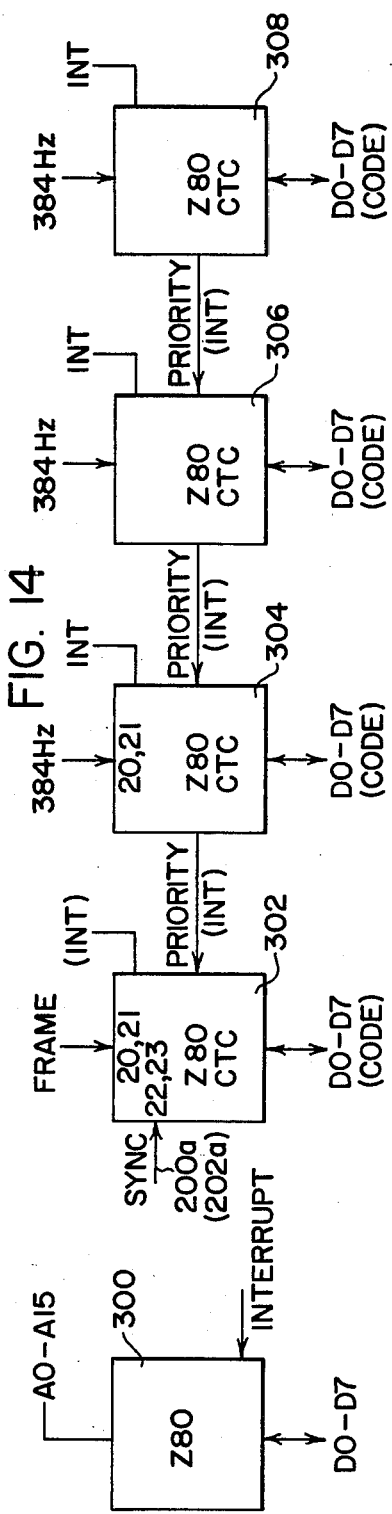
FIG. 14 is a block diagram illustrating schematically certain components of the processor employed in the preferred embodiment of the present invention.
Figure 15:
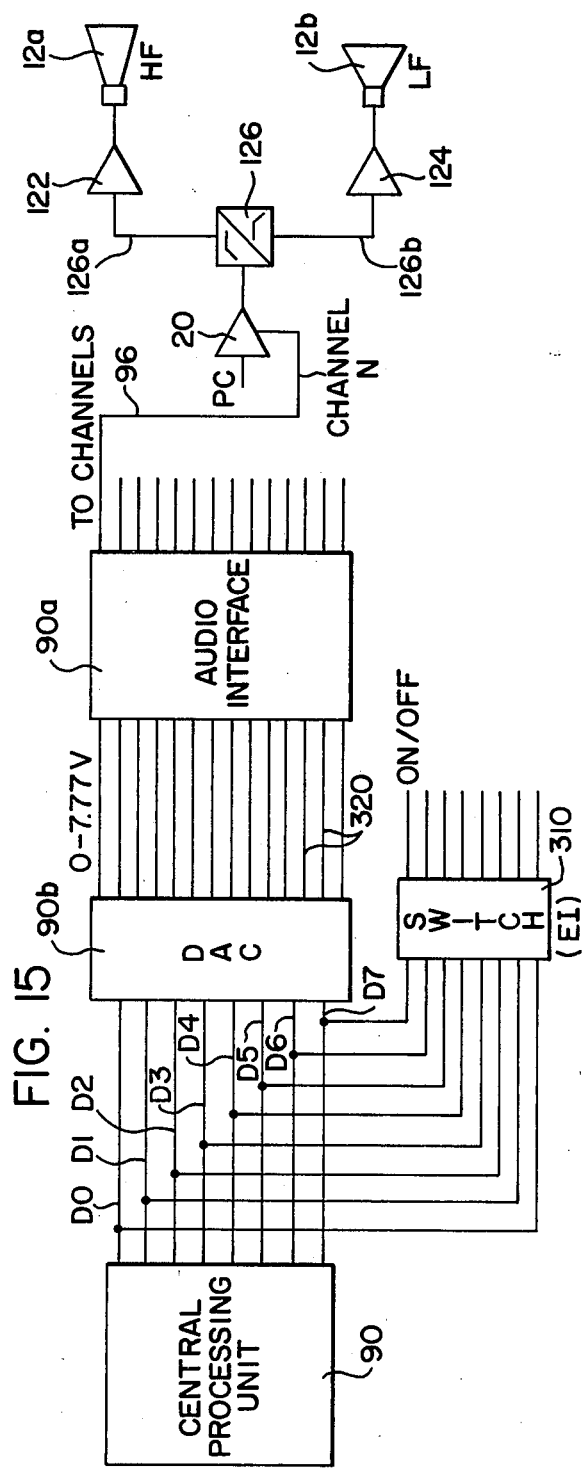
FIG. 15 is a schematic wiring diagram showing the output channel arrangement employed in the preferred embodiment of the present invention.

In FIG. 10 there is illustrated a hardwired counter which is a single stage of a CTC (Zilog) counter to be used in a system using the present invention and controlled by a Z80 microprocessing chip. As is known, Zilog CTC includes four internal counters which provide an interrupt signal when they count from a loaded number to zero. The number is reloaded after the interrupt signal unless the interrupt is at the end of a programmed cycle. In the preferred embodiment of the invention, four CTC counters 302–308 shown in FIG. 14 are used with a microprocessor 300 which is, in practice, a Z80 Zilog microprocessor having unidirectional address lines A0–A15 and bidirectional data lines D0–D7, which data lines correspond to the data lines illustrated in FIG. 12. The operation of each of the stages of the CTC counter is schematically illustrated in FIG. 10 and its use in the preferred embodiment is set forth in FIG. 10A. When processing a selected cue of the format illustrated in FIG. 8, the destination is first read and loaded into a scratch pad RAM. Thereafter, the stored existing destination from the prior cue is compared to the destination of the next cue to be processed. If the destination is different, then the next cue is processed. The time to reach this destination, or the rate, is then determined. It is then determined whether or not the destination requires an increment or decrement of the condition of the given channel and the amount of incrementing or decrementing to provide the desired rate to obtain the new destination. This increment or decrement data is then loaded into one stage of the hardwired CTCs and it is counted down at a frequency of 384 Hertz. After the loaded number in the CTC stage has been counted to zero, the CTC stage or section controlling the channel being processed creates an interrupt signal. At that time, the present destination of the channel is compared to the desired destination stored in RAM. If this does not correspond, the CTC section controlling the given channel is again loaded with the desired processing number and counted to zero for another interrupt cycle. The number of interrupt cycles from a CTC counter processing a cue is determined by the rate and destination of the cue. When a comparison has been reached between the actual destination and the desired destination, that stage of the CTC controlling the channel under consideration does not recirculate for an additional interrupt. Whenever there is an interrupt by counting down the CTC section assigned to a selected channel, the channel is incremented or decremented by the logic from a RAM location and is applied to D0-D7 which are directed by address lines A0-A15 to a digital to analog converter, as shown in FIG. 15. These analog signals are then directed to the specific channel being controlled by audio interface 90a shown in FIG. 2. Processing of the cues to increment channels in the desired fashion utilizing hardwired counters for decrementing or incrementing can be varied.

Figure 12:
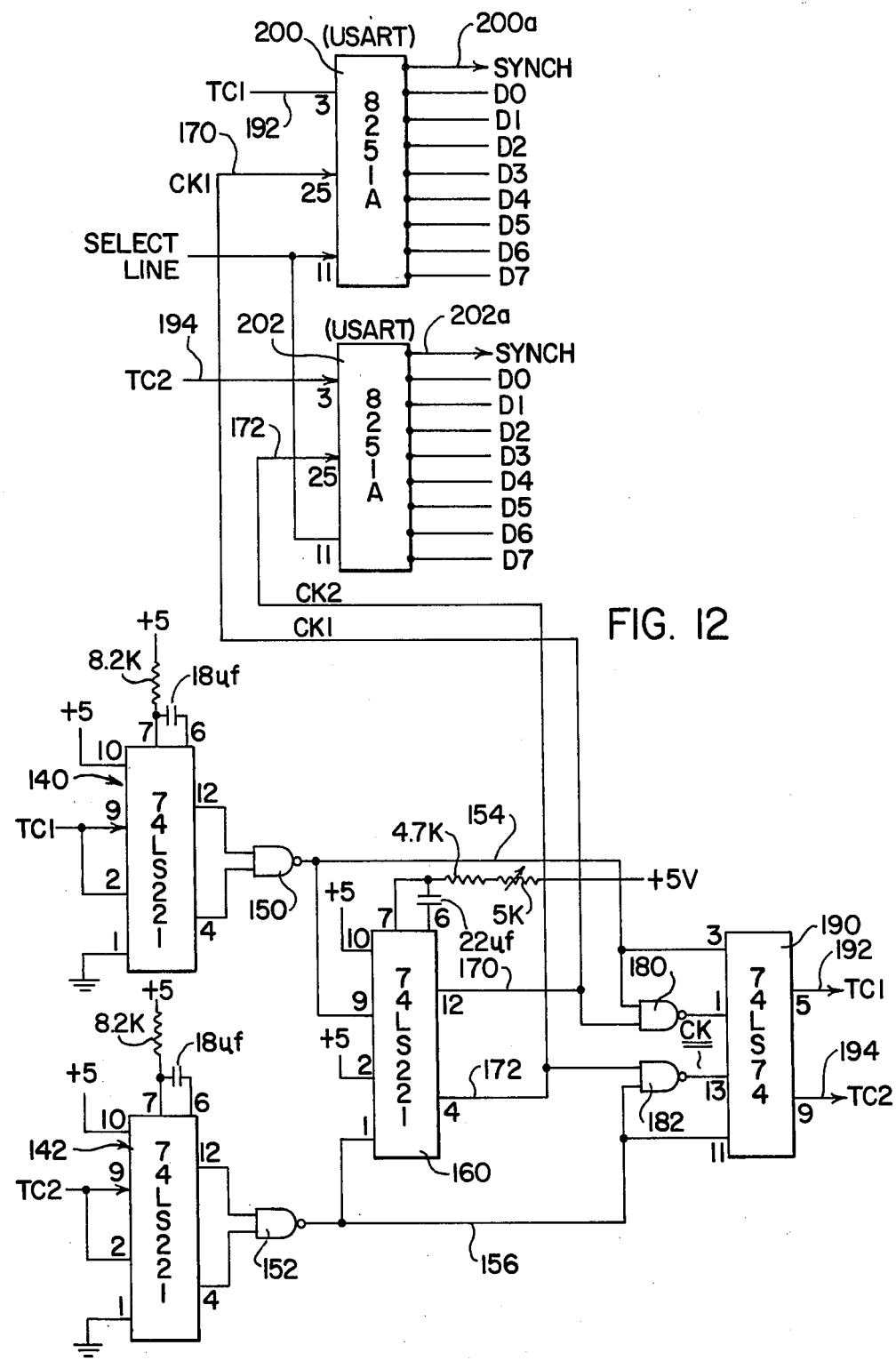
FIG. 12 is a schematic wiring diagram showing processing of the synchronizing code and time code words employed in the preferred embodiment of the present invention.

As shown in FIG. 14, the first CTC 302 receives a synchronizing pulse in line 200a or line 202a as created in the circuit shown in FIG. 12. By loading a logic 1 into the first stage of the first CTC counter, a synchronization pulse decrements CTC counter 302 to zero and causes an interrupt signal. This is the highest priority interrupt signal which indicates that a code is to be directed to the microprocessor on line D0-D7. Thereafter, the code is processed as previously indicated. The other three counting stages of CTC 302 are used for counters as illustrated in FIG. 10 to process the digital logic of the cue explained in connection with FIGS. 8 and 9. Consequently, there are fifteen hardwired counting stages in the CTC counters 302-308 used for cue processing. One of the stages is employed for a channel that produces eight bits of digital logic to control switching functions as illustrated in FIG. 15.

As so far explained, the first stage of the first CTC counter recognizes the existence of a time code. Thereafter, the time code appears on lines D0-D7 for stacking the cues to be processed. Thereafter, each of the cues for each of the separate channels is processed by a separate and distinct hardwired counter by loading a selected number into the counter and allowing the counter to count down to an interrupt condition. This causes an interrupt signal which is processed to either decrement or increment the analog or digital condition of a given channel. By loading a number indicative of both destination and rate into the counter for each count down to interrupt, and then updating the output channel at the interrupt, hardwired counters can be used for updating the information used in controlling the various channels of system A. For purposes of an example only, an attenuation table is illustrated in FIG. 10B. This table indicates the size of the steps between various analog signals which are updated each time a counter processing a given cue is interrupted. The left hand and right hand columns of this table are compliments in hexadecimal form. If the destination of a given cue is 10 dB, and the prior destination was 3.0 dB, the incremental steps between these two are determined by the attenuation table between the two destinations. At each interrupt, the output circuit will provide an analog signal to increase the speaker volume by the indicated step. Knowing the number of steps as obtained from the attenuation table stored in memory, the number loaded into the hardwired counter for each step is determined by the rate to reach the desired, new destination. Thereafter, upon reaching an interrupt the interrupt subroutine is processed to update the output in accordance with the attenuation table.

As can be seen in FIG. 14, the various CTC counters are daisy chained with positional priority so that the interrupts are processed in accordance with a daisy chain arrangement. Since CTC 302 is the highest priority, the first stage of this CTC provides the interrupt for synchronization to start the process for the next time sequence of film F.

Referring now more specifically to FIG. 15, a general layout of the output system contemplated for use in the preferred embodiment of the present invention is illustrated schematically with a single channel, i.e. the left channel shown in FIG. 2 is employed for the purposes of illustration. After the central processing unit has determined a given step for a given channel during the progress of a specific cue, digital information indicative of a new condition is applied to data lines D0-D7. A digital to analog converter 90b converts the signal into a 0-7.77 volts analog signal on one of fourteen separate output lines 320 each of which controls a selected analog controlled channel, such as a speaker or speaker set 12a, 12b,, as shown in FIG. 15. An audio interface 90a previously described directs the particular analog signal line to the desired output line, such as line 96 to control the volume of speakers 12a, 12b. In the fifteenth channel, 8 bits of digital data are provided to a switching circuit 310, which controls various special effects, such as motors, lights, sirens, horns, etc. As the eight second time interval of a cue progresses, the digital data at the input of switching circuit 310 is changed in accordance with the desired condition of the eight output lines. Each of these lines is latched to either a logic 0 or logic 1. Thus, system A using a Z80 microprocessor and four CTC counters controls fourteen analog lines and provides eight bits of digital data to turn special effects ON or OFF. FIG. 15 is used to illustrate the general layout of the preferred embodiment of the invention; however, other output layouts could be employed for utilizing the invention which relates to the cue processing, cue profile and time code concepts. Switching circuit 310 is a data latch which is updated periodically to provide updating at the output terminals in accordance with the logic on data lines D0-D7.

SYSTEM COMPATIBILITY

Figure 16:
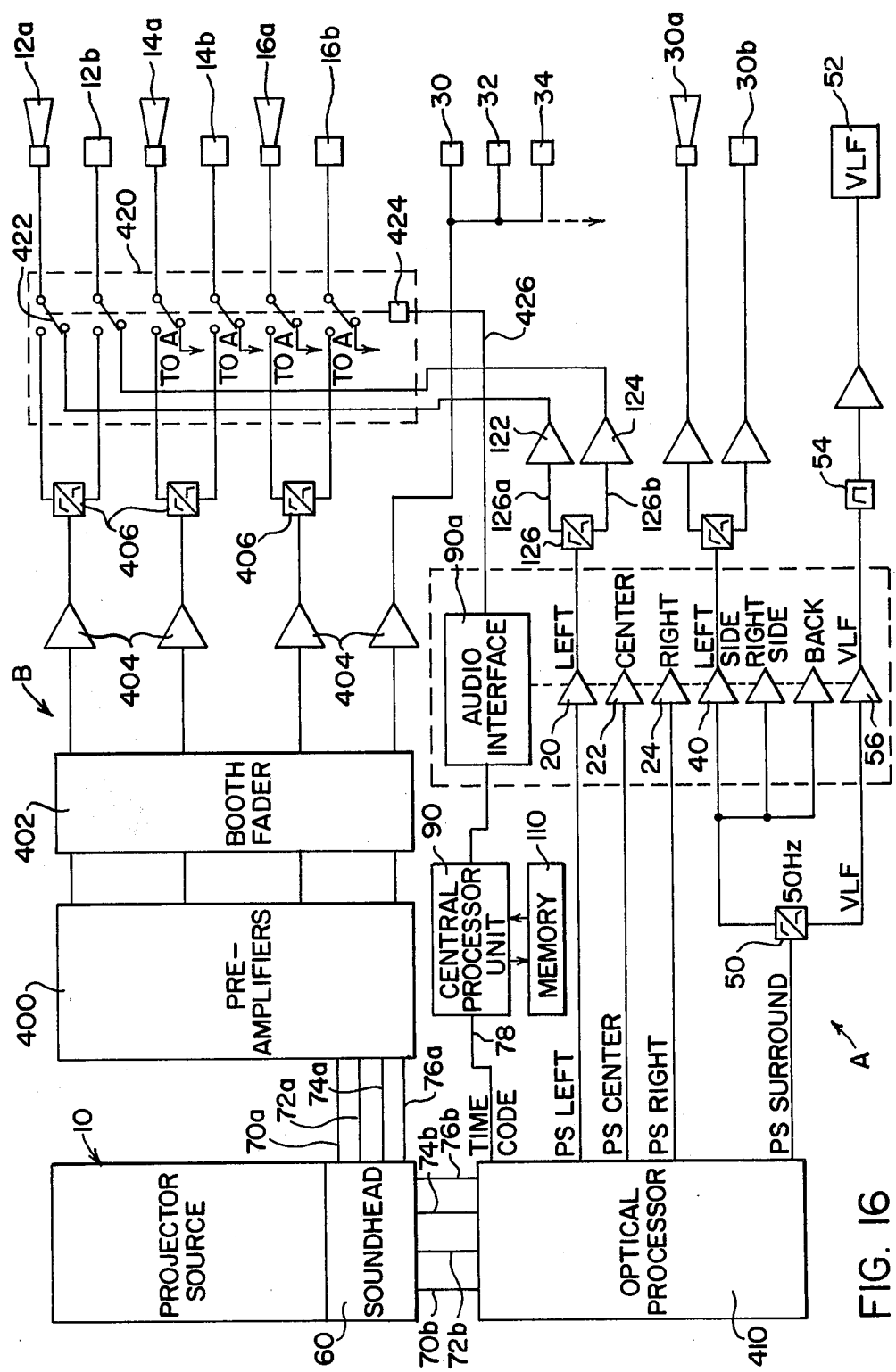
FIG. 16 is a wiring diagram illustrating the preferred embodiment of the present invention utilized in conjunction with standard projection and speaker systems employed in a theater.

Referring now to FIG. 16, a somewhat standard projecting system B of a theater is illustrated for use in conjunction with a system A as disclosed in FIGS. 1 and 2. Like numbers in system A refer to the same components as discussed in connection with FIGS. 1 and 2. System A would be used in a theater of the type having a standard sound system B. This standard sound system is referred to as system B wherein the program signals from pick-ups 60 are applied to program signal lines 70a-76a corresponding with sound tracks 70-76, respectively. These program signals are amplified by preamplifiers illustrated as box 400 and are then passed through a booth fader of standard design indicated as box 402. Power amplifiers 404 direct the program signals of lines 70a, 72a, 74a to dual band filters 406 and the program signal from track 76 directly to the surround speakers 30, 32, 34. As previously indicated, speakers 12, 14 and 16 can be divided into high frequency and low frequency speakers. In FIG. 16, these speakers are indicated as high frequency speakers 12a, 14a, 16a and low frequency speakers 12b, 14b, 16b. In projecting a standard film without recorded time codes having four program signals optically recorded on tracks 70-76, system B is employed using generally standard practice. When utilizing the present invention, film strip F includes spaced time codes and a pre-programmed PROM memory unit 110 is provided for each film. The theater is provided with a system A which can use standard speakers 12a, 12b, 14a, 14b, 16a and 16b together with other additional speakers such as very low frequency speaker or horn 52. An optical processor separates the time code and applies it in line 78. The program cycles for the left, center, right and surround channels are then applied in a fashion previously indicated to drive various voltage controlled amplifiers 20, 22, 40 and 56. To employ the existing speakers of standard system B, a switching network 420 is provided. The network includes a group of switches which connect the outputs of the various power amplifiers 122, 124 to the inputs of the speakers of system B. Only one interconnection is illustrated, i.e. for speakers 12a, 12b. Switch 422 is shifted by an operator 424 to line 426 from audio interface 90a when a system A is being operated. Switch 422 shifts speakers 12a, 12b to be controlled by amplifiers 122, 124 as opposed to amplifier 404 of system B. The other standard speakers would be simultaneously shifted to control by system A by actuation of operator 424 in accordance with the logic on line 426. Consequently, system A is usable in a theater having a standard sound system. When projecting a time coded film system A would be used. At other times standard film could be processed by system B.

ENCODING

Figure 17:
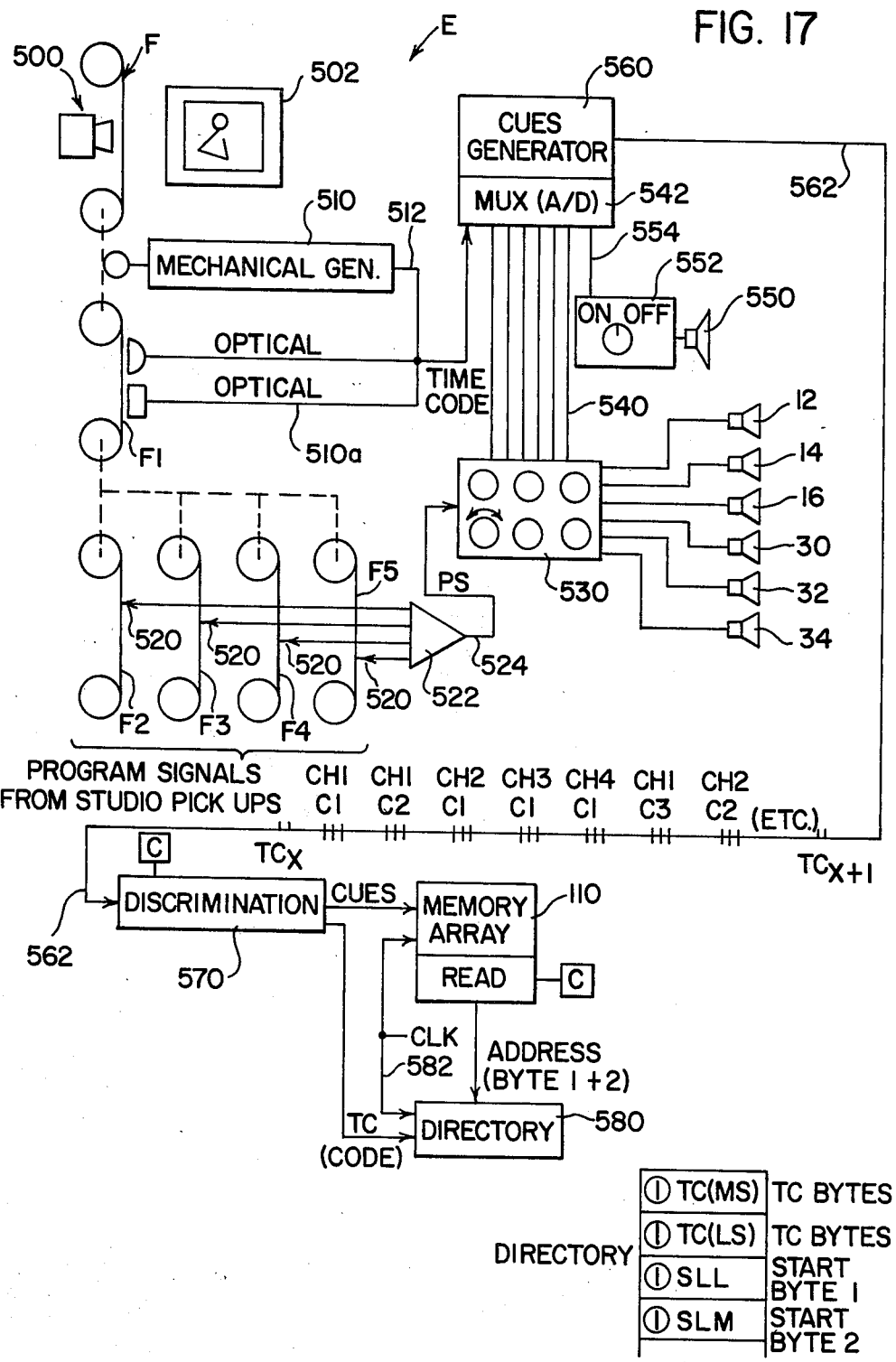
FIG. 17 is a schematic block diagram illustrating one encoding arrangement for creating the cues or digital control signals and the stored time code indicia employed in the preferred embodiment of the present invention; and, FIG. 18 is a block diagram illustrating the preferred embodiment of the arrangement for encoding the cues or control signals for memory module to be employed with a specific film strip.

A variety of systems could be employed for generating the digital cue information and for stacking it in memory unit 110 in locations corresponding to preselected time codes indicative of specific segments of film strip F. FIG. 17 schematically illustrates one system for accomplishing this function. Other arrangements could be employed to obtain the stacked cues to be used in the system of the preferred embodiment so far described. The encoder system E shown in FIG. 17 is used during initial mixing wherein various sound programs are recorded onto a plurality of film strips F1-F5 which are synchronized with the basic film strip F by standard mixing mechanisms. The studio projector 500 displays the film on a screen 502. The segment of the film being displayed is determined by a frame counter 510 which is used to mechanically generate a signal during each eight second segment of the film. The digital signal indicates a time code when it appears on line 512. The positional signal appears periodically to create a distinct time code for storage in the cue array. The time code is not in the 3 Hertz and 6 Hertz format which will ultimately be used on the film strip being projected in various theaters. The actual code is imprinted on the film later. The film strips F1-F5 contain certain channels of sound which have been recorded during exposure of the film and dubbed in later by well known systems. Each of these program signals, which include background music, loud horns, etc., is received by appropriate pickups 520 which may be optical or magnetic, and is amplified by one of several amplifiers 522, only one of which is shown. These program cycles are directed in selected channels through line 524 to a fader panel 530 which controls each channel associated with various distinct devices to be used in a displaying theater. These devices are illustrated as speakers 12, 14, 16, 30, 32 and 34. The analog conditions of the various channels from fader panel 530 are directed through a series of lines 540 to an analog to digital converter and multiplexer 542 of standard design. This multiplexer also receives information from a switch channel such as illustrated for a siren 550 having a switch 552 to provide binary information on a line 554. After receiving information on line 512, analog information regarding all the channels on lines 540 and switching information on one or more lines 554, converter 542 converts all this information to digital logic and directs it to a cue generator 560 which is an editor computer programmed to output a series of film position time codes as two word digital information and binary cues having three words. These cues are repeatedly generated as the multiplexer samples and directs the information from the various input lines to the computer for processing into the cue form previously described. The time codes in digital form and the three word cues are directed in serial fashion to a discriminator 570 which directs the three word cues into stacked position within memory array 110 which has a section designated as directory 580 previously discussed. Discriminator 570 is controlled by editor computer 560 to direct the digital time codes for the various stacking groups into the directory 580. Discriminator 570 is controlled by editor computer or cue generator 560 as indicated by the computer connection block C. In a like manner, a READ command is directed to memory array 110 from editor 560 to periodically read the two address bytes at the start of a cue stack in memory 110 for storage into directory area 580. Stacking and directory operation is coordinated by an external clock 582 to provide synchronization. This clock can be generated by editor computer 560. In this manner, memory array 110 with its directory 580 can be loaded with cues, time codes and address locations.

After encoding the memory unit 110, the program signals are ultimately combined and recorded on tracks 70-76 in optical format with the time codes superimposed in 3 and 6 Hertz format as previously described. Not until the final production of a film strip with the combining of all program signals onto the sound tracks 70-76 is the 24 Kilohertz format required for the time code. This time code is imprinted on the eight second segment of the film strip corresponding to the time code generated originally by a frame counter or other arrangement for indicating the various positions on a film strip. As illustrated in FIG. 17, an optical mechanism 510a could be used for creating the time code as a function of a particular segment of the film strip being processed. This time code could be generated on any of several of the strips F1-F5 being originally processed to combine into a final program signal format.

Figure 18:
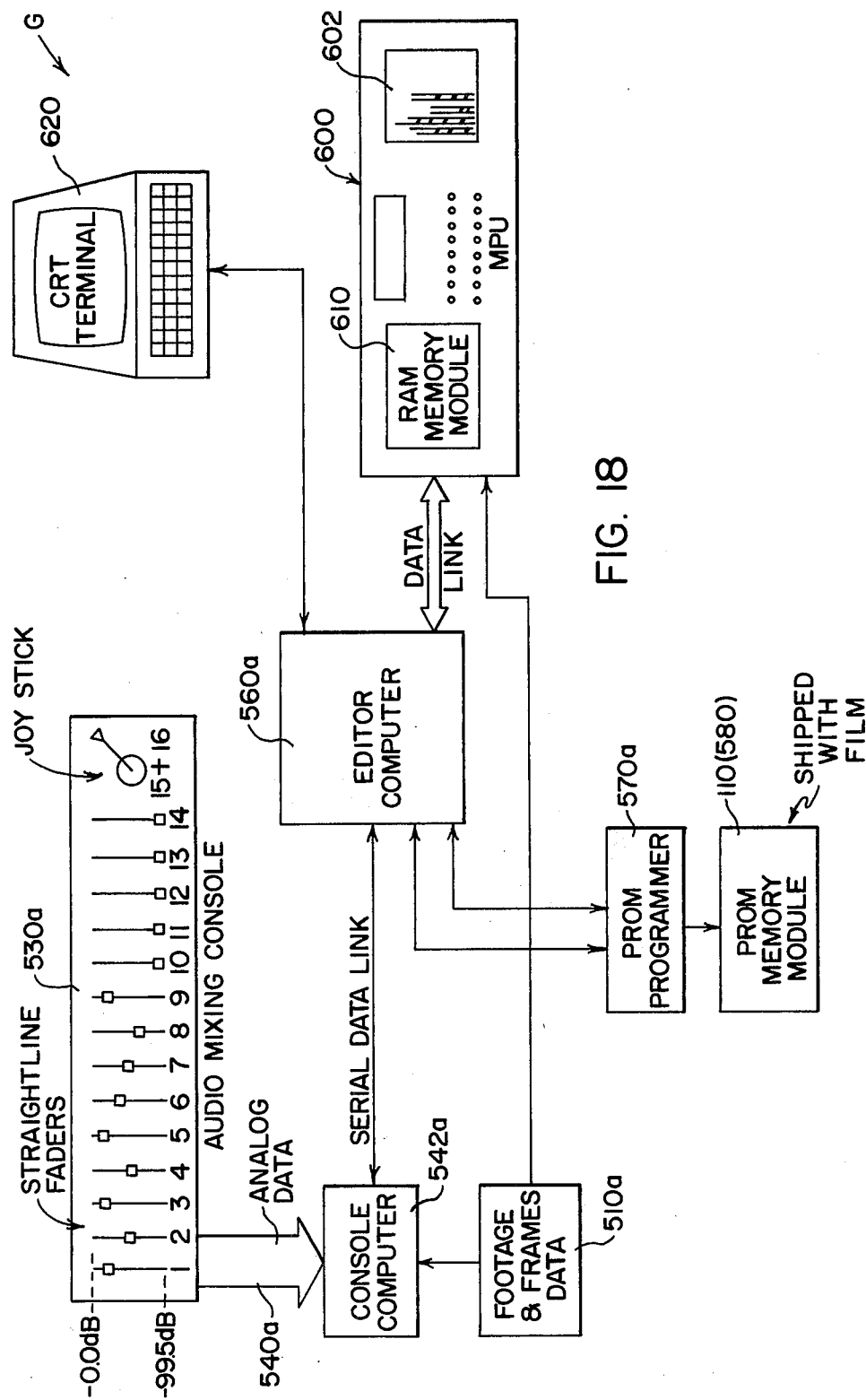

Another encoder scheme is illustrated in FIG. 18 wherein the components performing the function of similar components in FIG. 17 are identified with the postscript a. In this arrangement, a cabinet 600 houses the central processing unit 90 and is a unit which would be mounted in a theater using the system illustrated in FIGS. 1 and 2. This cabinet includes several lights 602 which indicate the level of volume of various channels being controlled by the programmable controller or central processing unit 90 contained in cabinet 600. This cabinet also houses the D to A converter 90b shown in FIG. 15 so that the outputs from the cabinet are lines 320 and the input lines for a switching network 310 as shown in FIG. 15. The switching network 310 and audio interface 90a are mounted adjacent the cabinet in the theater of ultimate use to be controlled by the logic in a memory module illustrated as memory module 110 (580). During encoding a RAM module 610 is used and corresponds to PROM module 110 (580) used in the system in a theater. RAM 610 is employed during encoding so that the RAM can be used as a scratch pad corresponding to the fixed memory ultimately used. When cabinet, or unit, 600 is employed in a theater, a fixed memory 110 (580) is placed in the receptacle. This fixed memory is unique for a particular motion picture being displayed in the theater. In the system G shown in FIG. 18, various channels are controlled in the studio by fader panel 530a. This provides analog data of the various channels through data lines 540a to the console computer 542a. This console computer also receives footage and frame data from a somewhat standard frame counter and generates the time code information previously described. Also, the console computer digitizes the channel information and directs the information in serial form to an editor computer 560a. This computer generates the cues and the time codes in the format previously mentioned and provides this digital information to the PROM programmer 570a which directs the information through the PROM memory module 110 which also incorporates the cue directory 580. Thus, PROM programmer 570a is controlled by editor computer 560a to load the PROM memory which is shipped with a particular film. PROM memory can be copied for various copies of the same motion picture. Also, the PROM can be of the type which is erasable for subsequent use if necessary. During this editing process, RAM memory module 610 is loaded with information regarding the cues so that the motion picture can be operated by RAM 610 in a manner which can be anticipated ultimately during display of the motion picture in remote theaters equipped to handle a system constructed in accordance with the present invention. To edit and monitor the encoding process, CRT 620 is connected to the editor computer. By calling up information the CRT can display the various data and can modify the format. Of course, other encoding arrangements could be employed to develop the cues, time codes and processing schemes anticipated in the present invention.

Having thus described the invention, it is claimed:

1. In a system for controlling a plurality of distinct devices in a theater displaying a projected motion picture contained on a moving film strip and in synchronization with said film strip, said system having a memory unit for storing groups of digital control signals for operating said distinct devices in a selected manner during a selected portion of said moving strip, means for selecting one of said groups of digital control signals for a selected portion of said moving strip and means independent of said film strip for causing said stored digital control signals of the selected group to be outputted in a time sequence corresponding to said selected portion of said film strip, the improvement comprising: a hardwired counter for each of said distinct devices; means for loading digital counts into said counters indicative of the desired operation of a corresponding device; means for counting said counters at a rate corresponding to the moving rate of said strip; and means for changing said device associated with a particular counter when said count is reached.

2. The improvement as defined in claim 1 including means for recycling at least some of said counters until said associated device is changed to a selected condition.

3. In a system for controlling a plurality of distinct devices in a theater having a sound reproduction network controlled by an audio signal recorded along a moving film strip and in synchronization with said strip, said system having a memory unit for storing groups of digital control signals for operating said distinct devices in a selected manner during a selected portion of said moving strip, means for selecting one of said groups of digital control signals for a selected portion of said moving strip and means independent of said strip for causing said stored digital control signals for the selected group to be outputted in a time sequence corresponding to said selected portion of said strip, the improvement comprising: said selecting means including a digital time code corresponding to the selected group of digital control signals to be outputted in a given time sequence, said groups of control signals being stored in a first memory unit; a directory memory means for storing a representation of said time codes and the address of corresponding memory control signal groups; means for selecting the address of a specific control signal group from said directory memory means by correlating a digital time code with a corresponding time code representation; means for transferring the group of control signals corresponding to said selected address into a RAM; and, means for using said group of signals in said RAM for controlling said distinct devices during the selected portion of said strip corresponding to said digital time code.

4. The improvement as defined in claim 3 including RAM means for storing the number of said control signals in a selected group for each of said plurality of distinct devices.

5. The improvement as defined in claim 4 including hardwired counters for each of said distinct devices and means for loading said counters with selected digital numbers determined by the control signals corresponding to said distinct devices and means for updating said distinct devices as said counter counts said selected portion.

6. The improvement as defined in claim 5 wherein said updating means includes means for converting digital data to analog data and means for directing said analog data to one of said distinct devices.

7. The improvement as defined in claim 5 wherein said updating means includes means for converting digital data to digital signal information and means for directing said digital information to one of said distinct devices.

8. In a system for controlling a plurality of distinct devices in a theater having a sound reproduction network controlled by an audio signal recorded along a moving film strip and in synchronization with said strip, said system having a memory unit for storing groups of digital control signals for operating said distinct devices in a selected manner during a selected portion of said moving strip, means for selecting one of said groups of digital control signals for a selected portion of said moving strip and means independent of said strip for causing said stored digital control signals of the selected group to be outputted in a time sequence corresponding to said selected portion of said strip, the improvement comprising: said selecting means including a digital time code corresponding to the selected group of digital control signals to be outputted in a given time sequence, each of said digital control signals including a first digital portion corresponding to the destination magnitude for a specific distinct device, a second portion corresponding to the time of commencing a change toward said destination and a third digital portion corresponding to the rate at which said destination magnitude is to be obtained after commencement.

9. The improvement as defined in claim 8 including a counter for a given distinct device, means for counting said counter at a known rate, means for loading a digital representation of said first and second portions and indicative of a desired incremental step of a given device into said counter, and means for updating said given distinct device by said incremental step upon each countout of said counter.

10. The improvement as defined in claim 9 wherein each of said control signals includes a third digital portion corresponding to the time delay before a control signal is to be performed, means for delaying actuation of said updating means for a time corresponding to said third digital portion.

11. The improvement as defined in claim 8 wherein each of said control signals includes a third digital portion corresponding to the time delay before a control signal is to be performed.

12. In a system for controlling a plurality of distinct devices in a theater having a sound reproduction network controlled by an audio signal recorded along a moving film strip and in synchronization with said strip, said system having a memory unit for storing groups of digital control signals for operating said distinct devices in a selected manner during a selected portion of said moving strip, means for selecting one of said groups of digital control signals for a selected portion of said moving strip and means independent of said strip for causing said stored digital control signals of the selected group to be outputted in a time sequence corresponding to said selected portion of said strip, the improvement comprising: said selecting means including a digital time code corresponding to the selected group of digital control signals to be outputted in a given time sequence, means for recording periodically said synchronizing code onto a selected fixed length portion of said moving film strip, means for recording said unique time codes on said moving strip following said synchronizing code and signal generating means for simultaneously creating and storing said control signals of a group corresponding to said time code in selected portions of said memory unit, said signal generating means including means for converting operation of said distinct devices during said selected portion of said moving film strip into a digital signal, means for stacking said digital signals into a memory unit and means for recording in a directory memory the location of said signals in said memory unit.

* * * * *